United States Patent Office

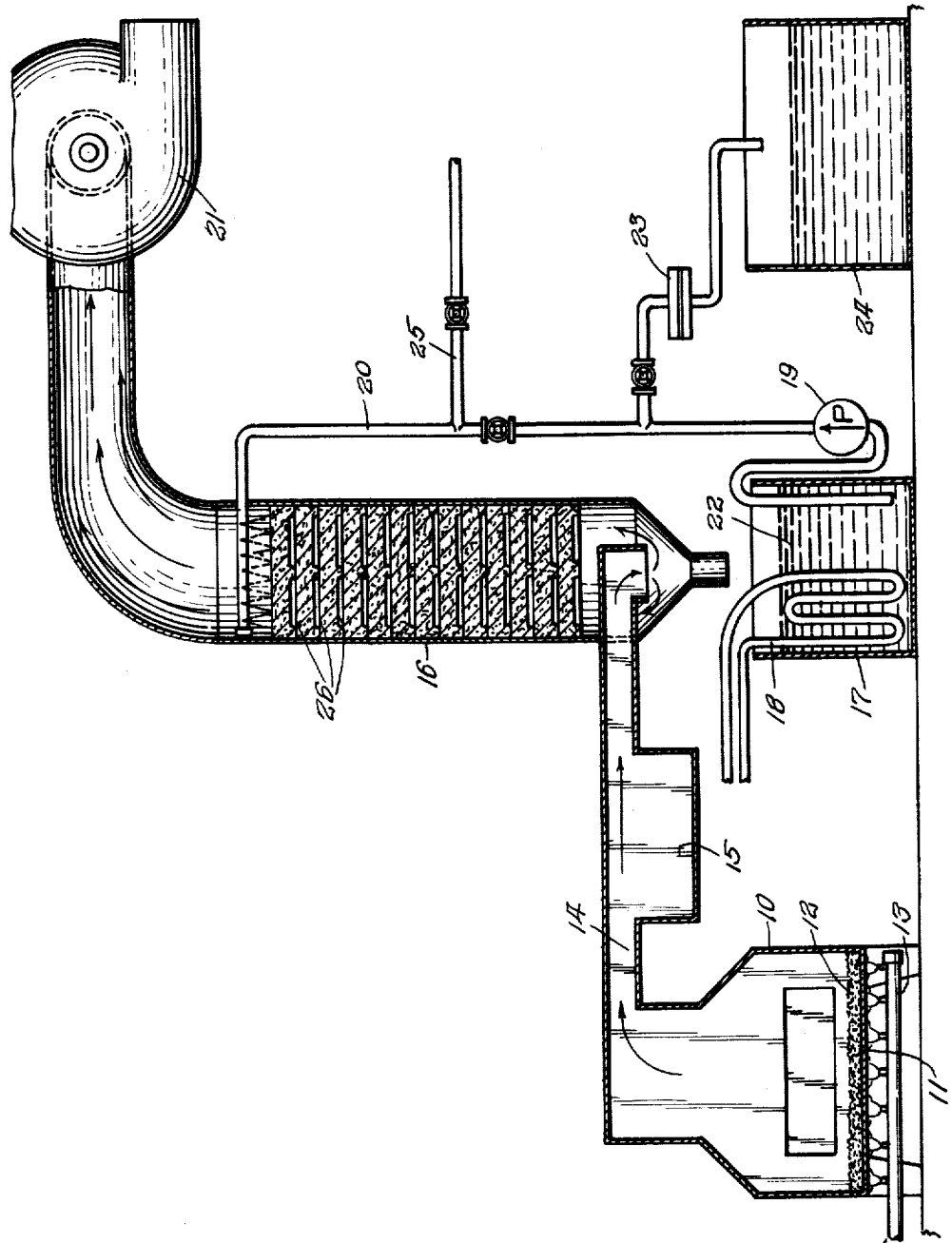

3,106,473
Patented Oct. 8, 1963

3,106,473
AQUEOUS SMOKE SOLUTION FOR USE IN FOODSTUFFS AND METHOD OF PRODUCING SAME
Clifford Maurice Hollenbeck, Manitowoc, Wis., assignor to Red Arrow Products Corporation, Milwaukee, Wis., a corporation of Wisconsin
Filed Dec. 27, 1961, Ser. No. 162,546
12 Claims. (Cl. 99—229)

This invention relates to an improved process of manufacturing an aqueous wood smoke flavored solution, a novel wood smoke flavor solution, the use of the solution in foods and novel apparatus useful in producing the wood smoke solution.

This application is a continuation-in-part of my copending applications Serial No. 796,729, filed March 3, 1959, now abandoned, Serial No. 53,147, filed August 31, 1960, now abandoned, and Serial No. 143,571, filed October 9, 1961.

A common method of imparting a wood smoke flavor to foods is by contacting the food directly with the smoke. Direct smoking of foods, however, has many shortcomings. Chief among these is the lack of flavor control due to only the surface of the food coming in contact with the smoke. As a result, the degree of "smokiness" depends upon the intensity and type of wood smoke; the area, time and temperature of contact; and extent of deposition of wood tars on the food surface.

From the standpoint of flavor control, it is greatly desirable to add wood smoke flavor to a food by means of a well characterized and controlled smoke flavor bearing product. Aqueous smoke flavor solutions have been used for this purpose before but none to date has been sufficiently well characterized or reproducible from the standpoint of having a desirable combination of flavor components. An advantage in the use of my smoke solution product in foods, over those usually sold in commerce, lies in its superior and reproducible flavor.

The commercially available smoke flavor solutions for use in foods comprise either the product from the destructive distillation of wood, or the condensate or aqueous solution of the constituents of smoke from wood burned with a limited amount of air. The major differences between a liquid smoke product produced with limited burning, and that from destructive distillation lie in the extent of break-down or "cracking" of insoluble tarry material. In destructive distillation more of the insoluble material is broken down and solubilized and the resulting solution is higher in the undesirable phenolic and hydrocarbon compounds and lower in insoluble resins than with limited oxidation. (See Pettet and Lane, "A Study of the Chemical Composition of Wood Smoke," J. Soc. Chem. Ind. 59, 118 (1940) (Table IV).)

From a smoke flavor standpoint, it is desirable to limit the extent of breakdown of the insoluble tars since a high phenolic content in the product imparts an undesirably strong "creosotic-like" flavor to the product and because increased cracking and solubilization of the tarry residues also increases the possibility of pharmacologically undesirable substances being present in the finished product. For these reasons, it is better to produce more insoluble tarry material in the smoke by producing the smoke with limited burning and then to separate this from the smoke flavor solution.

Wood smoke is a very complex mixture containing a diversity of compounds ranging from gaseous carbon dioxide and the relatively volatile liquid methanol to the resinous solids in the tarry fraction. Pettet and Lane, supra, have shown that the composition of wood smoke changes with, among other things, the rate of air flow over the smoldering wood, the combustion temperature, type and variety of wood and the means of collecting the product. All of these things to some extent affect the nature of the smoke flavor recovered in an aqueous smoke product.

It has been discovered according to the present invention that an aqueous wood smoke flavored solution of superior flavor and reproducible properties free of undesirable materials can be produced by the repetitive countercurrent extraction of wood smoke with cool to warm water and advisably until the titratable acidity of the acidic and phenolic substances in the aqueous smoke extract is at least 3% by weight of the solution. However, if upon a single extraction with water the titratable acidity of the smoke solution reaches at least 3%, further recycling need not be made.

The water used in the extraction is maintained in the comparatively cool to warm range of 40° F. to 140° F. while in contact with the smoke. To prevent the water from being overheated while in contact with the smoke it is advisably brought at a temperature of about 70° F. into contact with the smoke and taken out of contact with the smoke before the temperature goes above 120° F. The smoke solution is then advisably cooled as warranted to compensate for the heat input of the smoke before recycling when necessary to bring the titratable acidity above 3%. Before recycling, the smoke solution is generally cooled to a temperature not above 70° F. and advisably to not above 40° F. The preferred range of water temperature for the extraction is 70° F. to 120° F.

It has been found that the use of water at a temperature of 40° to 140° F. in the extraction allows very volatile compounds to pass through without significant absorption, while increasing the efficiency of extraction of the desirable materials such as phenolic substances, and without appreciable extraction of the undesirable polycyclic hydrocarbons or pharmacologically undesirable tarry materials. Furthermore, the water used in the extraction is sufficiently warm to promote polymerization or condensation of some of the resinous materials and the relatively reactive constituents, such as formaldehyde, thus allowing their ready removal before the liquid product is packaged and shipped.

The invention will now be discussed in conjunction with the attached drawing. In the drawing, a smoke generator 10 having a grate 11 to hold hardwood material 12, generates smoke by the application of heat as by burner 13. The smoke rises in the generator and passes through the restricted tubular exit 14 at a relatively high velocity and into the tubular settling chamber 15 where the velocity of the smoke is reduced and in which the smoke is retained momentarily. The tubular settling chamber has about 8 times the cross-sectional area as the exit tube. Heavy tars and wood ash settle to the bottom of the settling chamber.

The wood smoke is conducted from the settling chamber into the bottom of a column 16 advisably packed with inert material such as ceramic saddles 26 to facilitate intermingling of the smoke with water fed into the top of the column through pipes 25 and 20 which trickles downwardly in the column counter-current to the upward smoke flow. Fan exhaust means 21 is provided to draw the smoke through the column.

After the water has trickled through the column where it is warmed by the smoke it is fed into a receiving tank 17 provided with cooling coils 18 to cool the aqueous smoke extract 22. The aqueous smoke extract may then be recycled to the top of the column by means of pump 19 and line 20 (water line 25 being closed) and fed repeatedly through the column until the titratable acidity reaches the desired level.

After the aqueous smoke extract has been produced it is pumped from the tank 17 through a filter 23, advisably a filter made up of a mat of cellulose pulp which removes tars with a minimum removal of the desirable acidic and flavor constituents. The filtered aqueous wood smoke solution is then fed to a storage tank 24 or it may be bottled immediately.

Recyling of the aqueous smoke extract is advisably continued until it has a titratable acidity of at least 3%, and preferably and acidity of about 3% to 8%. An acidity of about 6% is considered most desirable although 5% to 7% acidity is also highly satisfactory. The titratable acidity comprises the combined effect of both acidic substances and phenolic substances in the aqueous smoke solution. The solutions with lower acidity than about 3% are generally too weak in flavor to be good adjuncts to foods. On the other hand, smoke solutions with higher concentrations than about 8% titratable acidity become too potent with strong flavored resinous materials since the acetic acid, etc., concentration is sufficiently high to effect their solubilization. An index of the level of acidic substances to the level of phenolic substances is the ratio of the milliliters of standard base required to titrate a given quantity of the smoke solution to pH 5.5 (acids) to the number of milliliters required to increase the pH of the solution from pH 5.5 to pH 7.0 (phenols). The most desirable solution from a flavor standpoint is found to have an index of at least 7.0 and advisedly at least 7.5. Lower ratios (below 7.0) give a "creosotic" aspect to the flavor which has been the major drawback to previous smoke flavor solutions. The maximum acidic-phenolic index for suitable smoke solutions appear to be about 25.0.

A particularly acceptable product for flavoring foods is an aqueous smoke solution having a titratable acidity of 6.0% to 7.2% with the major acid constituent being acetic acid, and having a phenol concentration of 6.2 to 8.3 milligrams per milliliter expressed as dimethoxyphenol.

It has also been found that aqueous smoke flavored extracts can be produced continuously with greater absorptive efficiency of the smoke by recyling a smoke solution having an acidity of 3% to 8%, and advisably 5% to 8%, downwardly through the column 16. A greater pickup of smoke is achieved with a recycle stream containing 3% acidity or higher due apparently to the greater solubility of the smoke constituents in the organic content of the recycled smoke solution. This beneficial finding facilitates producing aqueous smoke flavored extracts in a continuous system. For example, the aqueous smoke flavored extract 22 having the acidity desired in the end product can be pumped from tank 17 by pump 19 and, by use of suitable metering pumps in line 25 and the line leading to filter 23, part of the aqueous smoke flavored extract can be filtered and conveyed to tank 24 while part of the extract can be pumped through line 20 and diluted with water from pipe 25. The slightly diluted smoke extract can then be passed through the column countercurrent to the flow of smoke.

The extent of dilution of the recycled smoke extract in pipe 20 must be adjusted to the rate of flow of the smoke and the total volume of liquid that is recycled. It is obvious, however, that the acidity of the diluted smoke extract recycled to the column top is to be sufficiently high so that up percolating through the column it is raised to an acidity essentially equal to that of the smoke solution 22 in tank 17.

The aqueous smoke flavored extract is added to foods in any desirable amount according to the degree of smokiness sought. The application of heat to the foods is considered beneficial, however, to disperse the flavor therein most thoroughly and bring out the full flavor and aroma of the smoke by reaction of the smoke compounds with food constituents.

Although my invention has been described in connection with the use of hardwood smoke therein, it is to be understood that the invention is also operable with smoke produced by the burning, in a limited amount of air, of other vegetable matter including corn cobs, bark, straw, etc.

Examples of my invention are shown in the following:

EXAMPLE I

The efficiency of the extraction of the desirable flavor constituents (including acids and phenols) from smoke with water in the range of 40° F. to 140° F. is demonstrated in Table I. Smoke was generated by burning 10 g. of maple sawdust in a limited amount of air. The smoke was bubbled through 100 ml. of water at the designated temperature; the smoke solution was filtered through a mat of wood cellulose pulp. Flavor comparisons were made by adding low levels of the smoke solutions to tomato paste, slowly cooking the paste for about 30 minutes, cooling and tasting.

*Table I*

| Water temp., ° F.: | Flavor rating |
|---|---|
| 40 | Good minus. |
| 70 | Very good. |
| 100 | Good. |
| 120 | Fair plus. |
| 140 | Fair minus. |

The data in Table I demonstrates the favorable effect on the flavor of the smoke extract in increasing the temperature of the extraction water from 40° F. to 70° F. Furthermore, they show that this favorable effect decreases, and a less favorable effect is noted, when the temperature of the water is increased above 100° F. as to 140° F., in other words, the favorable effect of increasing the water temperature passes through an optimum range of temperatures, and then declines. Repeated experiments of this type have demonstrated the optimum temperature range for the extraction of favorable flavor constituents from smoke is from about 70° F. to about 120° F. It is noted, also, that when the temperature is increased the efficiency of the extraction, based on increased total acidity, is improved. Too high a temperature, however, causes reaction and precipitation of some of the desirable flavoring constituents, and the increased solubility of other undesirable constituents.

EXAMPLE II

Comparisons of the flavor of my smoke solution with commercial products, in terms of the acidic to phenolic index, are shown in Table II.

*Table II*

| Smoke Solution | Acidic-Phenolic Index | Flavor |
|---|---|---|
| Product A | 4.8 | Strongly phenolic. |
| Product B | 6.8 | Phenolic. |
| My Smoke Solution: | | |
| Laboratory preparation | 7.7 | Sweet smokiness—very good. |
| Production Lot 55 | 7.9 | Do. |
| Production Lot 56 | 9.0 | Do. |
| Production Lot 66 | 14.3 | Smoky—good. |
| Production Lot 67 | 11.2 | Sweet smokiness—very good. |
| Production Lot 74 | 25.0 | Slight acid smokiness—fair. |

The flavor comparisons were made in samples of meat.

EXAMPLE III

The data in Table III illustrates the desirability of using a smoke solution with a titratable acidity of at least 3% (based on acetic acid). The smoke solutions were evaluated for flavor, at the same acid level, in a manner similar to Example I.

*Table III*

| Titratable Acidity, percent | Acidic-Phenolic Index | Flavor Rating |
| --- | --- | --- |
| 1 | 10.0 | Weak. |
| 3 | 8.6 | Fair. |
| 5 | 8.0 | Very good. |
| 6 | 7.7 | Do. |
| 8 | 8.0 | Good. |

EXAMPLE IV

During the extraction of the flavor constituents from the smoke some of the insoluble wood tars are suspended in colloidal state, and a certain amount of insoluble resinous materials are produced, presumably by the reaction of some of the aldehydic substances with some of the phenolic substances. Benzpyrene, a carcinogenic hydrocarbon, is often found associated with these colloidal particles of tars and resins, further necessitating the desirability of filtering these solutions to remove these suspended particles. Ordinary filter paper or cloth is generally not fine enough to remove the very fine suspended material. Use of adsorbents such as activated charcoal, fuller's earth and bentonite remove the suspended material including the benzpyrene, but these adsorbents also remove some of the desirable flavoring and coloring constituents from the smoke solution. Cellulose pulp, more specifically a refined wood cellulose pulp known as Solka-Floc, was found to work well as a filter-aid. The cellulose seems to adsorb the suspended tar and/or the benzpyrene without adsorbing the desirable flavor constituents, to give a clear liquid. In fact, when benzpyrene was added to a clear smoke solution, or even an acetic acid solution, it was removed by filtering through a pad of cellulose pulp. More resinous material may form after the solution is filtered so an aging period is often desirable prior to the filtration, or a second filtration may be desirable after an interim aging period. Smoke flavor solutions which have shown by chromatographic analysis to contain benzpyrene prior to filtration through a pad of cellulose pulp were found to be free of, or to contain less than detectable amounts of, benzpyrene after filtration (e.g., less than one-half part per billion, which is the sensitivity of the chromatographic test). Silica gel, asbestos pulp, nylon powder, and diatomaceous earth "Celite," also aided in the removal of colloidal tars, without excessive color and flavor removal, but none of them seemed to be quite as effective as cellulose pulp.

EXAMPLE V

Analytical data showing total acidity and total phenols (expressed as dimethoxyphenol) on representative lots of my smoke flavor solution are shown in Table IV.

*Table IV*

| Lot | Phenols [1] (Dimethoxyphenol) (mg./ml.) | Acetic Acid [2] (Percent) |
| --- | --- | --- |
| 1 | 8.28 | 7.13 |
| 2 | 7.26 | 6.17 |
| 3 | 7.22 | 6.09 |
| 4 | 6.57 | 6.41 |
| 5 | 6.29 | 6.28 |
| 6 | 6.36 | 6.32 |
| 7 | 6.25 | 6.30 |
| 8 | 7.42 | 7.11 |
| 9 | 6.96 | 6.97 |
| 10 | 6.32 | 6.65 |
| 11 | 6.64 | 6.35 |
| 12 | 6.39 | 6.61 |

[1] Modified Gibb's colorimetric procedure, Journal of Assoc. Off. Agric. Chem. 25, 779 (1942), total phenols expressed as dimethoxyphenol.
[2] Direct titration expressed as acetic acid.

EXAMPLE VI

Ten g. samples of a seasoned tomato paste were flavored with 0.05 ml., 0.1 ml., and 0.2 ml. respectively, of smoke solution (6% titratable acidity). The samples were mixed well and allowed to simmer in a boiling water bath for 1 hour. The preparations were cooled and tasted. The smoke solution at the 0.1 ml. level imparted a very delightful "smokiness" to the tomato paste, which would be comparable to a barbeque sauce. The 0.05 ml. level was about borderline in detectable "smokiness" and the 0.2 ml. level was probably more than enough for the average consumer.

EXAMPLE VII

Fifty g. samples of cheese were melted in a hot water bath. Three ml. of homogenized milk were added to each sample and the melted mass mixed well. Smoke solution (6% titratable acidity) was added to these samples in the molten state at the level of 0.5%, 1.0% and 2.0% by weight respectively, of the cheese. The mixture was cooled and allowed to set into a semi-solid mass. The smoke solution imparted a very delightful smoky flavor to the cheese.

EXAMPLE VIII

Thirty-five g. portions of chopped beef were cured with a solution of the usual curing agents, including sodium chloride, sucrose, sodium nitrite, sodium nitrate, ascorbic acid and sodium bicarbonate, plus 0.7%, 1.0%, and 1.3% by weight of the meat, respectively, of a 6% titratable acidity smoke solution. The curing solution was added to the samples of chopped beef, mixed thoroughly, and then the smoke solution was added with further mixing. The meat mixtures were incubated in an oven at 165° F. for 4 hours. The beef samples developed a good pink, cured-meat color, and the smoke solution gave them a very desirable "smoked-sausage-like" flavor.

EXAMPLE IX

Chunks of pork were cured in the usual way by soaking in a brine solution containing the usual curing agents. After the curing solution penetrated well and the color-fixing effect of the nitric oxide was underway, the pork chunks were placed in a cover solution of a 6% titratable acidity smoke solution for 2 hours to 7½ hours, respectively. The chunks were then placed in an oven at 165° F. for 4 hours. The pork chunks developed a good internal pink, "cured-meat" color, and a brown exterior color. The flavor of the smoke solution treated samples was excellent, very similar to well smoked ham or bacon. The smoke flavor was detectable in the chunks soaked for 2 hours, and increasingly stronger with the longer soaking periods.

The use of my smoke flavor solution in foods obviously can be expanded to other modes of addition, other quantities, and other foods. For example, it could be injected into the vascular system of a ham, or "stitch" pumped into a slab of pork, either as is or in combination with a properly buffered curing solution, in the manner now used for curing solutions for hams and bacon. It is not intended that this invention be limited in scope by the specific examples.

Various changes and modifications of the invention can be made, and to the extent that such variations incorporate the spirit of this invention, they are intended to be included within the scope of the appended claims.

What is claimed is:

1. A process of making an aqueous wood smoke flavored solution for use in foodstuffs comprising burning wood with a limited amount of air to form smoke, conducting the smoke upwardly through a column packed with inert material countercurrently to a stream of water at a temperature in the range of 40° F. to 140° F. moving downwardly through the column, removing the resulting smoke extract from the column before its temperature goes above 140° F., cooling the aqueous smoke extract to maintain the extract at a temperature below 140° F., recycling the aqueous smoke extract downwardly through the column countercurrently to wood smoke moving upwardly therein until the aqueous smoke extract reaches a titratable acidity of at least 3%, and filtering the extract to remove undesirable materials including benzpyrene.

2. A process of making an aqueous wood smoke flavored solution for use in foodstuffs comprising burning wood in a limited amount of air to form smoke, conducting the smoke upwardly through a column packed with inert material countercurrently to a stream of water at a temperature in the range of 70° F. to 120° F. moving downwardly through the column, cooling and recycling the resulting aqueous smoke extract at a temperature in the range of 70° F. to 120° F. downwardly through the column countercurrently to wood smoke moving upwardly therein until the aqueous smoke extract reaches a titratable acidity of at least 3%, and filtering the extract to remove undesirable materials including benzpyrene.

3. The process according to claim 2 in which the filtering is effected through cellulose pulp.

4. A process of making an aqueous wood smoke flavored solution for use in foodstuffs comprising burning wood with a limited amount of air to form smoke, passing the smoke countercurrently to water at a temperature in the range of 70° F. to 120° F., cooling and recycling the resulting aqueous smoke extract at a temperature in the range of 70° F. to 120° F. countercurrently to wood smoke until the aqueous extract reaches a titratable acidity of at least 3% and filtering the extract to remove undesirable materials including benzpyrene.

5. A process of making an aqueous wood smoke flavored solution for use in foodstuffs comprising burning wood with a limited amount of air to form smoke, passing the smoke countercurrently to water at a temperature in the range of 70° F. to 120° F., cooling and recycling the resulting aqueous smoke extract at a temperature in the range of 70° F. to 120° F. countercurrently to wood smoke until the aqueous extract reaches a titratable acidity of at least 3% and filtering the aqueous smoke extract through cellulose pulp to remove undesirable materials including benzpyrene.

6. A process of making an aqueous wood smoke flavored solution for use in foodstuffs comprising burning wood with a limited amount of air to form smoke, conducting the smoke upwardly through a column packed with inert material countercurrently to a stream of water at a temperature in the range of 70° F. to 120° F. moving downwardly through the column, removing the resulting smoke extract from the column before its temperature goes above 120° F., cooling and recycling the aqueous smoke extract at a temperature of 70° F. to 120° F. downwardly through the column countercurrently to wood smoke moving upwardly therein until the aqueous extract attains a titratable acidity of 5% to 7% and an acidic to phenolic index of at least 7.0 and filtering the smoke extract to remove undesirable materials including benzpyrene.

7. The process of imparting a wood smoke flavor to an edible food which comprises burning wood with a limited amount of air to form smoke, passing the smoke countercurrently to water at a temperature in the range of 40° F. to 140° F., cooling and recycling the aqueous smoke extract at a temperature of 40° F. to 140° F. countercurrently to wood smoke until the aqueous extract reaches a titratable acidity of at least 3%, filtering the smoke extract to remove undesirable materials including benzpyrene, and contacting the food with the resulting aqueous smoke extract.

8. The process of giving a food material a wood smoke flavor which comprises mixing the food material with an aqueous wood smoke solution having a titratable acidity of at least 3% with the major acid constituent being acetic acid, and which is substantially free of undesirable materials including detectable amounts of benzpyrene.

9. The process of claim 8 in which the product is subsequently heated to develop the full smoke flavor in the food material.

10. A process of making an aqueous wood smoke flavored solution for use in foodstuffs, comprising burning wood with a limited amount of air to form smoke, passing the smoke into contact with a current of water at a temperature in the range of 40° F. to 140° F., cooling and recycling the resulting aqueous smoke extract at a temperature in the range of 40° F. to 140° F. into contact with a current of wood smoke until the aqueous extract reaches a titratable acidity of at least 3%, and filtering the smoke extract to remove undesirable materials including benzpyrene.

11. An aqueous wood smoke, produced according to the process of claim 10, solution for use in foodstuffs having a titratable acidity of at least 3% with the major acid constitutent being acetic acid and containing less than detectable amounts of benzpyrene.

12. A process of making an aqueous wood smoke flavored solution for use in foodstuffs, comprising burning wood with a limited amount of air to form smoke, extracting the smoke with water by contacting a current of the smoke with water at a temperature in the range of 40° F. to 140° F., maintaining the water temperature in said range during the extraction, continuing the extraction until the aqueous extract of the wood smoke reaches a titratable acidity of at least 3%, and filtering the smoke extract to remove undesirable materials including benzpyrene.

References Cited in the file of this patent

UNITED STATES PATENTS

| | | |
|---|---|---|
| 511,288 | Chase | Dec. 19, 1893 |
| 2,670,295 | Ash | Feb. 23, 1954 |

UNITED STATES PATENT OFFICE
CERTIFICATE OF CORRECTION

Patent No. 3,106,473                          October 8, 1963

Clifford Maurice Hollenbeck

It is hereby certified that error appears in the above numbered patent requiring correction and that the said Letters Patent should read as corrected below.

Column 8, line 34, after "smoke" insert -- solution --; line 35, strike out "solution".

Signed and sealed this 7th day of April 1964.

(SEAL)
Attest:

ERNEST W. SWIDER
Attesting Officer

EDWARD J. BRENNER

Commissioner of Patents